(12) United States Patent
Tsymerman

(10) Patent No.: US 6,336,957 B1
(45) Date of Patent: Jan. 8, 2002

(54) METHOD AND APPARATUS FOR EXTRACTING WATER FROM ATMOSPHERIC AIR

(75) Inventor: Alexander Tsymerman, Odessa (UA)

(73) Assignee: Watertech M.A.S. Ltd. (IL)

( * ) Notice: Subject to any disclaimer, the term of this patent is extended or adjusted under 35 U.S.C. 154(b) by 0 days.

(21) Appl. No.: 09/719,697

(22) PCT Filed: Jun. 16, 1999

(86) PCT No.: PCT/IL99/00332

§ 371 Date: Feb. 19, 2001

§ 102(e) Date: Feb. 19, 2001

(87) PCT Pub. No.: WO99/66136

PCT Pub. Date: Dec. 23, 1999

(30) Foreign Application Priority Data

Jun. 17, 1998 (IS) .................................................. 124978

(51) Int. Cl.⁷ ............................................. B01D 53/26
(52) U.S. Cl. ............................. 95/115; 95/95; 95/117; 96/146
(58) Field of Search ............................ 95/115, 95, 96, 95/106, 117, 121, 125, 126, 21; 96/146; 62/93, 271

(56) References Cited

U.S. PATENT DOCUMENTS

| | | | |
|---|---|---|---|
| 4,197,713 A | * | 4/1980 | Bulang ........................... 62/94 |
| 4,285,702 A | * | 8/1981 | Michel et al. |
| 4,345,917 A | * | 8/1982 | Hussmann |
| 4,377,398 A | * | 3/1983 | Bennett ........................ 96/146 |
| 4,726,817 A | * | 2/1988 | Roger |
| 5,846,296 A | * | 12/1998 | Krumsvik ..................... 95/115 |
| 5,857,344 A | * | 1/1999 | Rosenthal ....................... 62/93 |
| 6,251,172 B1 | * | 6/2001 | Conrad ......................... 96/122 |

FOREIGN PATENT DOCUMENTS

| | | | |
|---|---|---|---|
| EP | 0039151 A1 | * | 11/1981 |
| JP | 56147612 A | * | 11/1981 |
| JP | 10071320 A | * | 2/1998 |

* cited by examiner

Primary Examiner—David A. Simmons
Assistant Examiner—Frank M. Lawrence
(74) Attorney, Agent, or Firm—Mayer, Brown & Platt

(57) ABSTRACT

The present invention relates to method and apparatus for extracting water from atmospheric air. The method according to an embodiment of the invention does not depend on day and night temperature differentials and can operate at lower temperatures than were possible before. The present invention makes it possible to extract water vapors from the atmospheric air in relatively simple, inexpensive industrial plants or in smaller portable devices. The method according to the present invention includes: (a) causing ambient air to be drawn across a sorbent material (6) which is disposed in an enclosure (1) having a first area containing the sorbent material (6) and a second area containing condenser (13); (b) hermetically sealing the enclosure (1) from the atmosphere, after the sorbent material (6) has been fully saturated with water vapor; (c) causing desorption of the water from the sorbent material (6) by heating it, raising thereby the enclosure (1) internal pressure; (d) creating a partial vacuum in the enclosure (1) and a pressure differential between the first and second area, by venting residual air and an amount of water vapor from the enclosure (1), so that water vapor flows from the first area to the condenser (13); and (e) collecting the water which condenses on the condenser.

11 Claims, 2 Drawing Sheets

METHOD AND APPARATUS FOR EXTRACTING WATER FROM ATMOSPHERIC AIR

Figure 1:
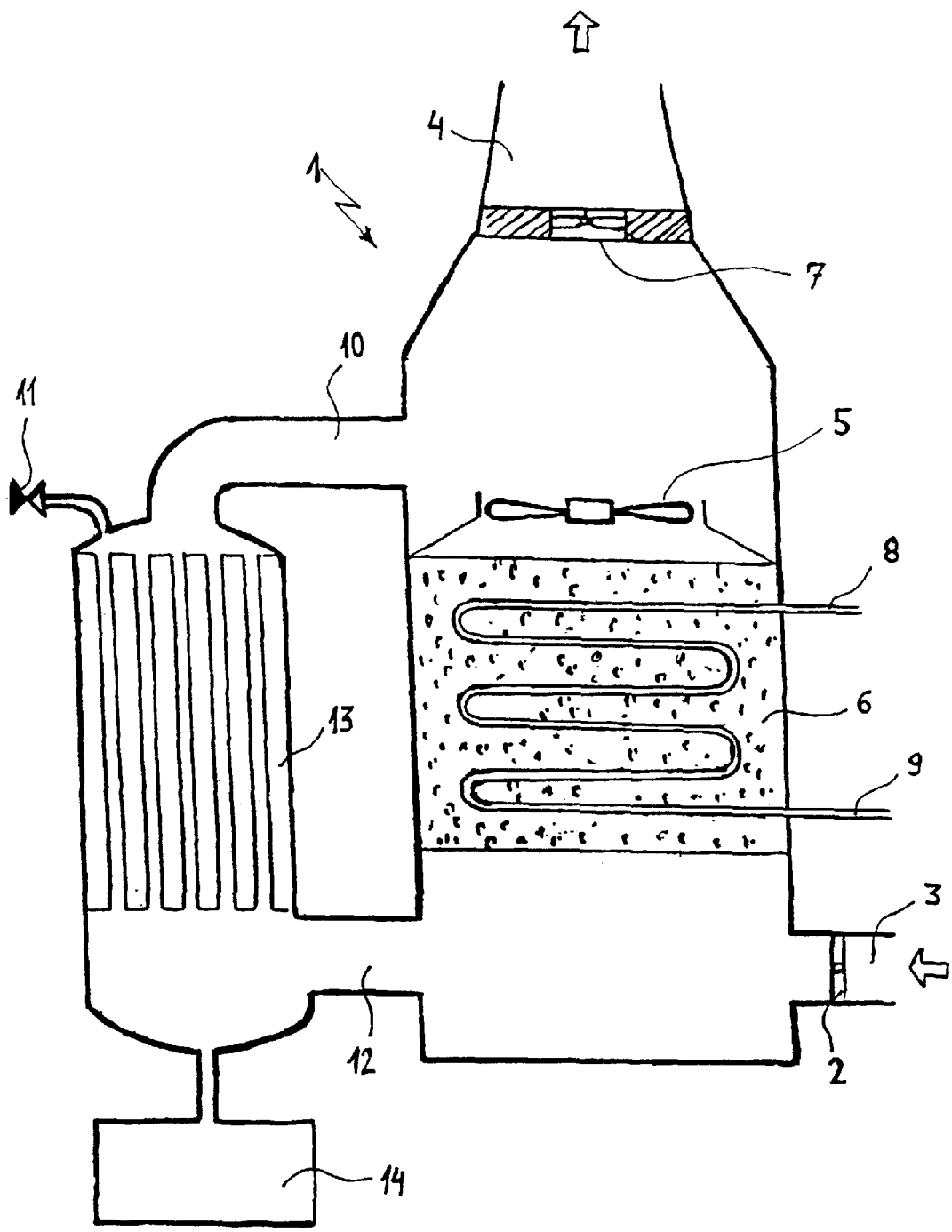

This application is a 371 of PCT Application No. PCT/IL99/00332, filed on Jun. 16, 1999.

FIELD OF THE INVENTION

The present invention provides a novel method and apparatus for extracting water from atmospheric air. The invention is particularly suited for implementation in hot, relatively arid areas of the world, where ground sources of fresh water are limited or where the production and transportation of fresh water involves great difficulties or considerable expense.

BACKGROUND OF THE INVENTION

Various methods of extracting water from atmospheric air are known; however, the known methods have not been economical, in that the devices utilizing these methods require relatively costly energy sources in order to run efficiently and are mostly limited to a single cycle of operation within each 24 hour period utilizing the temperature differentials between night and day.

U.S. Pat. No. 4,285,702 describes a method of recovering water from atmospheric air by letting cool night air pass in one direction through an adsorber filled with water-adsorbing material, and during the day time reversing the flow of the air, after it has been heated, thereby drying the adsorbing material and condensing the water vapor. During the desorption phase, two closed air flows are formed, which are passed through the heating device and the adsorbing material multiple times. This method is limiting, in that it can be implemented primarily in the framework of a day-night cycle, and is not energy-efficient, requiring heating to relatively high temperatures during the desorption phase.

SUMMARY OF THE INVENTION

The present invention overcomes the drawbacks of the known methods of extracting water from atmospheric air. It provides a mode of extracting water from atmospheric air at any time of day or night, is not dependent upon temperature differentials between the cooler air at night and the warmer air during the day, and is energy-efficient, operating at substantially lower temperatures than is possible utilizing known methods and devices. The present invention makes it possible to extract water vapors from the atmospheric air in relatively simple, inexpensive industrial plants, or in smaller portable devices, without requiring significant inputs of energy. The condensation of water vapor according to the present invention can be done at any temperature of the ambient air, and it does not involve the use of chemicals or other substances that may be ecologically harmful.

There is therefore provided, in accordance with the present invention, a method for extracting water from atmospheric air, the method comprising the steps of:

(a) causing ambient air to be drawn across a sorbent material adapted to adsorb and/or absorb water vapor, the sorbent material being disposed in an enclosure comprising a first area containing the sorbent material and a second area containing a condenser;

(b) hermetically sealing the enclosure from the atmosphere, after the sorbent material has been fully saturated with water vapor;

(c) causing desorption of the water vapor from the sorbent material by heating the sorbent material, raising thereby the internal pressure of the enclosure;

(d) creating a partial vacuum in the enclosure and a pressure differential between the first area and the second area, by venting residual air and an amount of water vapor from the enclosure, so that water vapor flows from the first area to the condenser in the second area; and (e) collecting the water which condenses on the condenser.

In accordance with a preferred embodiment of the invention, the sorbent material may be a solid or a liquid which is cooled during step (a) by ambient air drawn through conduits physically in contact with the sorbent material.

In accordance with a further embodiment of the invention, the water vapor which is vented in step (d) flows to a second condenser and the water which condenses thereon is collected together with the water from step (e).

There is also provided, in accordance with the present invention, apparatus for extracting water from atmospheric air, the apparatus comprising:

(a) an enclosure having first and second areas and adapted to be alternatively open to atmospheric air and hermetically sealed from atmospheric air;

(b) a sorbent material, adapted to adsorb and/or absorb moisture from the air, disposed within the first area and a condenser mounted within the second area;

(c) means for drawing ambient air across the sorbent material when the enclosure is open to atmospheric air;

(d) means for alternately cooling and heating the sorbent material;

(e) means for creating a partial vacuum within the enclosure and a pressure differential between the first and second areas; and (f) a water collector adapted to collect the water that condenses on the condenser, and the apparatus is characterized by having means for creating a partial vacuum within the enclosure, the means is a pressure-sensitive valve which opens when the internal pressure of the enclosure exceeds a pre-determined threshold.

In accordance with a preferred embodiment of the invention, the sorbent material is either a solid or a liquid and the means for cooling and heating comprise a system of conduits in physical contact with the sorbent material and in which flows ambient air.

In accordance with another embodiment of the invention, the apparatus also comprises a second condenser which communicates with the enclosure via the pressure-sensitive valve and a second water collector adapted to collect the water that condenses on the second condenser.

DETAILED DESCRIPTION OF THE INVENTION

Figure 2:
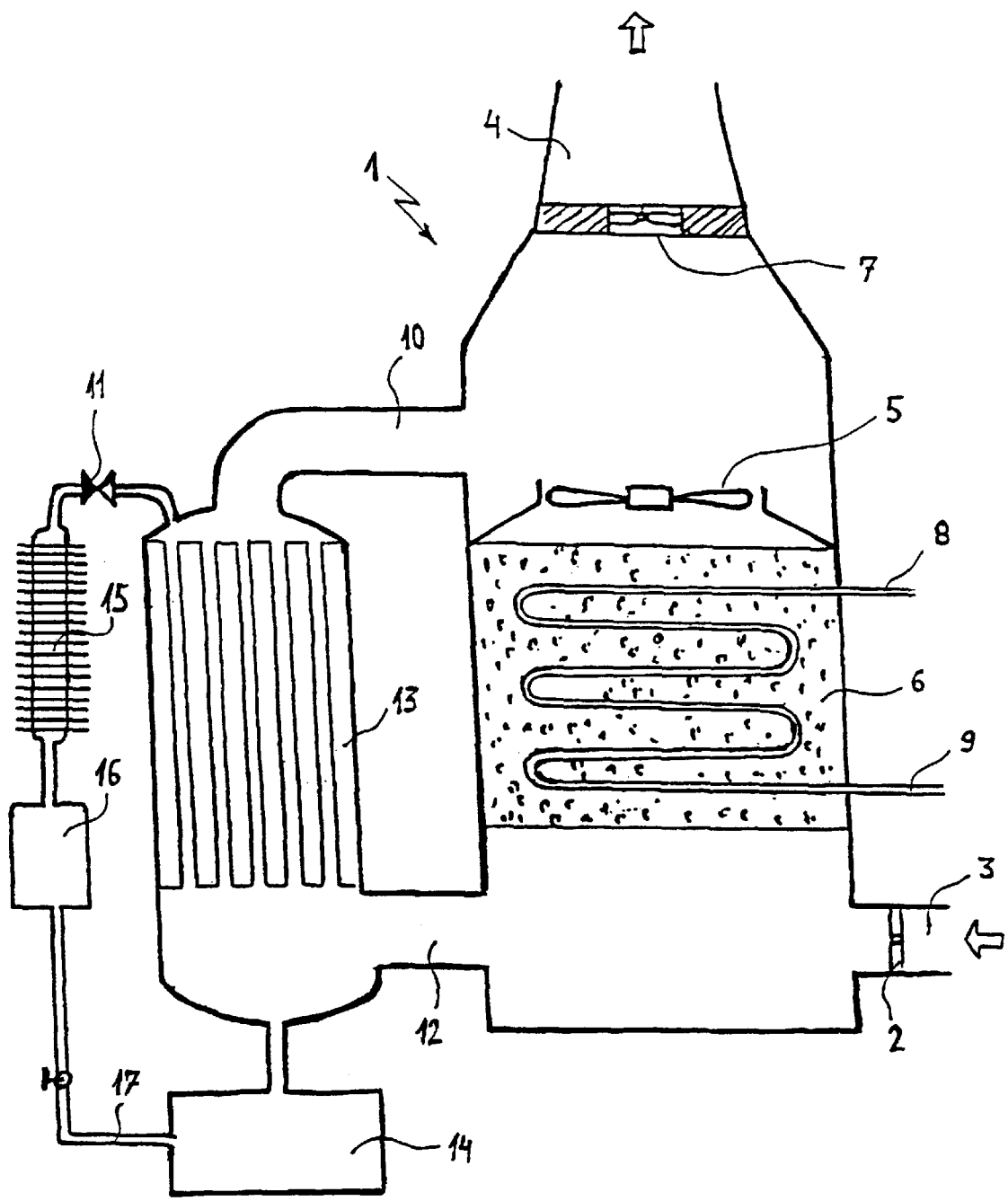

The present invention may be better appreciated with reference to the accompanying diagrams, in which:

FIG. 1 presents in schematic form one embodiment of water extraction apparatus in accordance with the present invention; and FIG. 2 presents in schematic form a second embodiment of water extraction apparatus in accordance with the present invention.

As shown in FIG. 1, the apparatus comprises an enclosure 1, have an inlet 3 and an exhaust stack 4. Within inlet 3 is a valve 2, and within exhaust stack 4 is a valve 7. Fitted within enclosure 1 is a sorbent material 6, adapted to absorb and/or absorb moisture from the air. The sorbent material may be silica gel, a molecular sieve, lithium chloride, or any other solid or liquid sorbent as is known in the art, which is capable of absorbing and/or absorbing moisture from the air. Sorbent material 6 is disposed within enclosure 1 in such manner that it is in physical contact with an array of conduits having a inlet 8 and an outlet 9 and which are adapted to allow circulation therein of a cooling or heating medium, for purposes more fully described below. Situated above sorbent material 6 and below stack 4 is a fan 5.

Enclosure 1 is connected via pipes 10 and 12 to a condenser 13, which may be any type of condenser as is known in the art, but preferably is air-cooled. Through appropriate plumbing, condenser 13 is connected to a water collector 14, which is adapted to receive and hold water which condenses on condenser 13 and flows therefrom. The apparatus also includes a pressure-sensitive valve 11, which is normally in a closed position, but which is operative to open when the pressure in enclosure I exceeds a pre-determined threshold.

Referring now to FIG. 2, it will be seen that the apparatus of FIG. 2 is identical to that of FIG. 1, but with the addition of a secondary condenser 15. Secondary condenser 15 communicates with enclosure 1 via pressure valve 11. Through appropriate plumbing, secondary condenser 15 communicates with a water collector 16, which is adapted to receive and hold water which condenses on condenser 15 and flows therefrom. Water collector 16 further communicates with water collector 14, via plumbing 17.

The operation of the apparatus is as follows: During a first phase, while both valve 2 and valve 7 are in an open position, ambient air is drawn through inlet 3 and into enclosure 1. Driven by the force of a draught created either by exhaust stack 4 and/or by fan 5, the air passes through sorbent material 6 and releases moisture to it through adsorption and/or absorption. The air which is both dried and heated by the sorption process is vented outside enclosure 1 through stack 4, via valve 7. To intensify the sorption process, heat preferably is removed from sorbent material 6 by a coolant circulating therethrough, entering through conduit 8 and exiting through conduit 9. Preferably, the coolant is ambient air, although any type of liquid coolant may also be used.

When sensors (not shown), such as humidity sensors or any other appropriate type of sensor as is known in the art, provide an indication that sorbent material 6 is fully saturated with water, inlet valve 2 and outlet valve 7 are moved to a closed position and enclosure 1 (including pipes 10 and 12 and condenser 13) is thereby hermetically sealed from the atmosphere. At the same time, the circulation of coolant within conduits 8 and 9 is discontinued, and in its stead, a heat transfer medium is circulated therethrough, so as to heat sorbent material 6. The heat transfer medium preferably is air or water, which preferably is heated by solar energy or any other low cost energy source.

The heating of sorbent material 6 effectuates a desorption of the water vapor adsorbed and/or absorbed on the sorbent material, such that water vapor begins to fill enclosure 1. Since enclosure 1 is hermetically sealed, the pressure inside the enclosure begins to rise, and at a pre-determined pressure, valve 11 opens, to enable the venting from enclosure 1 of the residual air contained therein as well a small amount of water vapor. As a consequence of this venting of the vapor-gas mixture from enclosure 1, the pressure within enclosure 1 falls and valve 11 closes, creating thereby a partial vacuum within enclosure 1 as well as a pressure differential between the region of condenser 13 and the region where desorption of sorbent material 6 is occurring. Since the pressure in the region of desorption is higher than the pressure in the region of condenser 13, water vapor flows from the region of higher pressure, through pipes 10 and 12, to condenser 13. On contact with the heat-exchange surfaces of condenser 13, the water vapors become liquified, and the water thus obtained flows down to collector 14.

It will be appreciated that due to the creation of the partial vacuum within enclosure 1, the desorption of sorbent material 6 and the condensation of the water vapors on condenser 14 can be efficiently effectuated at a reduced temperature, in comparison with the temperature that would otherwise be needed. The optimal temperature will vary, depending upon the specific sorbent material used, the temperature of the ambient air, and other factors, but in all cases will be lower than the operative temperature that would be needed using conventional methods. As a consequence, significant savings can be achieved in the operating costs of the apparatus of the present invention.

After the desorption/condensation phase of the process has been completed, valves 2 and 7 are again opened and the circulation of the heat transfer medium in conduits 8 and 9 is discontinued. The water collected in collector 14 is then available for use by the end-user, by any conventional means.

The operation of the apparatus of FIG. 2 is identical to that of FIG. 1, but the apparatus of FIG. 2 also enables the recovery of the moisture that is vented from enclosure 1, when valve 11 opens. Thus, instead of being vented into the atmosphere, the water vapor is vented into an enclosure containing secondary condenser 15 and the vapor thus released is condensed thereon. The water which condenses on condenser 15 then flows to a secondary collector 16 and, upon completion of the desorption phase of the cycle, the water in collector 16 is allowed to flow into collector 14, via pipeline 17.

It will be appreciated that the adsorption/desorption cycle described above can be repeated as often as necessary, without regard to temperature differentials between night-time and daytime. The apparatus can thus be used repeatedly, around the clock, and for this reason as well is more economical and more efficient that known apparatus.

It will be appreciated that the present invention is not limited by the above description and encompasses many adaptations and variations thereof all of which can be readily grasped and understood by a man of the art. The invention is limited only by the claims which follow:

What is claimed is:

1. A method of extracting water from atmoshperic air, comprising:

(a) causing ambient air to be drawn across a sorbent material (6) adapted to absorb or absorb water vapor, the sorbent material (6) being disposed in an enclosure (1) comprising a first area containing the sorbent material and a second area containing a condenser (13);

(b) hermetically sealing the enclosure (1) from the atmosphere, after the sorbent material has been fully saturated with water vapor;

(c) causing desorption of water vapor from the sorbent material (6) by heating the sorbent material (6), raising thereby the internal pressure of the enclosure (1);

(d) creating a partial vacuum in the enclosure (1) and a pressure differential between the first area and the second area, by venting residual air and an amount of water vapor from the enclosure (1), so that water vapor flows from the first area to the condenser (13) in the second area; and (e) collecting the water which condenses on the condenser (13).

2. A method according to claim 1, wherein the sorbent material is a solid or a liquid sorbent material.

3. A method according to claim 1, wherein the sorbent material is cooled during step (a).

4. A method according to claim 3, wherein the sorbent material is cooled by ambient air drawn through conduits which are physically in contact with the sorbent material.

5. A method according to claim 1 wherein the water vapor which is vented in step (d) flows to a second condenser (15) and condenses theron.

6. A method according to claim 5 wherein the water which condenses on the second condenser and the water which condenses in step (e) are collected together.

7. Apparatus for extracting from atmospheric air, comprising:
   (a) an enclosure (1) having first and second areas and adapted to be alternatively open to atmospheric air and hermetically sealed from atmospheric air;
   (b) a sorbent material (6), adapted to adsorb or absorb moister from the air, disposed within the first area and a condenser (13) mounted within the second area;
   (c) means for drawing ambient air across the sorbent material (6) when enclosure (1) is open to atmospheric air;
   (d) means for alternately cooling and heating the sorbent material (6);
   (e) means for creating a partial vacuum within the enclosure (1) and a pressure differential between the first and second areas; and
   (f) a water collector (14) adapted to collect the water that condenses on the condenser (13) and said apparatus is characterized by having means for creating a partial vacuum within the enclosure (1), said mean is a pressure-sensitive valve (11) which opens when the internal pressure of the enclosure (1) exceeds a predetermined threshold.

8. Apparatus according to claim 7, wherein the sorbent material is a solid or a liquid sorbent material and wherein the means for cooling and heating comprise a system of conduits in physical contact with the sorbent material and in which flows ambient air.

9. Apparatus according to claim 7, further comprising a second condenser which communicates with the enclosure via the pressure-sensitive valve.

10. Apparatus according to claim 9, further comprising a second water collector adapted to collect the water that condenses on the second condenser.

11. Apparatus according to claim 10, further comprising means for combining water that collects in the second water collector with the water that collects in the first water collector.

* * * * *

UNITED STATES PATENT AND TRADEMARK OFFICE
CERTIFICATE OF CORRECTION

PATENT NO. : 6,336,957 B1 Page 1 of 1
DATED : January 8, 2002
INVENTOR(S) : Tsymerman It is certified that error appears in the above-identified patent and that said Letters Patent is hereby corrected as shown below:

Column 2,
Line 64, replace "have" with -- having --.
Line 66, replace "absorb" with -- adsorb --.

Column 3,
Line 3, replace the first occurrence of "absorbing" with -- adsorbing --.
Line 18, replace "I" with -- 1 --.

Column 4,
Line 52, replace the first occurrence of "absorb" with -- adsorb --.

Column 5,
Line 22, replace "moister" with -- moisture --.

Column 6,
Line 7, replace "mean" with -- means --.
Line 23, "combining" insert -- the --.

Signed and Sealed this

Twenty-second Day of October, 2002

Attest:

JAMES E. ROGAN
*Attesting Officer*     *Director of the United States Patent and Trademark Office*